(No Model.)

G. W. TAFT.
MACHINE FOR MAKING, REPAIRING, AND CLEARING ROADS.

No. 341,609. Patented May 11, 1886.

WITNESSES.

INVENTOR (No Model.)  6 Sheets—Sheet 2.

G. W. TAFT.
MACHINE FOR MAKING, REPAIRING, AND CLEARING ROADS.

No. 341,609. Patented May 11, 1886.

FIG. 2

INVENTOR
George W. Taft
By Chas. H. Burleigh
Attorney

WITNESSES.

(No Model.) 6 Sheets—Sheet 3.

G. W. TAFT.
MACHINE FOR MAKING, REPAIRING, AND CLEARING ROADS.

No. 341,609. Patented May 11, 1886.

WITNESSES

INVENTOR
George W. Taft
By Chas. H. Burleigh
Attorney (No Model.) 6 Sheets—Sheet 4.
G. W. TAFT.
MACHINE FOR MAKING, REPAIRING, AND CLEARING ROADS.
No. 341,609. Patented May 11, 1886.

WITNESSES
INVENTOR

(No Model.) 6 Sheets—Sheet 5.

G. W. TAFT.
MACHINE FOR MAKING, REPAIRING, AND CLEARING ROADS.

No. 341,609. Patented May 11, 1886.

(No Model.)  6 Sheets—Sheet 6.

G. W. TAFT.

MACHINE FOR MAKING, REPAIRING, AND CLEARING ROADS.

No. 341,609.  Patented May 11, 1886.

WITNESSES.
M. W. Wheeler
D. R. Barton

INVENTOR
George W. Taft
By Chas. H. Burleigh
Attorney

UNITED STATES PATENT OFFICE.

GEORGE W. TAFT, OF ABINGTON, CONNECTICUT.

MACHINE FOR MAKING, REPAIRING, AND CLEARING ROADS.

SPECIFICATION forming part of Letters Patent No. 341,609, dated May 11, 1886.

Application filed August 10, 1885. Serial No. 173,968. (No model.)

*To all whom it may concern:*

Be it known that I, GEORGE W. TAFT, a citizen of the United States, residing at Abington, in the town of Pomfret, in the county of Windham and State of Connecticut, have invented certain new and useful Improvements in Machines for Making, Repairing, and Clearing Roads; and I declare the following to be a description of my said invention sufficiently full, clear, and exact to enable others skilled in the art to which it appertains to make and use the same, reference being had to the accompanying drawings, which form a part of this specification.

My present invention relates to certain improvements in the construction of that class of road-machines wherein the blade or scraping apparatus is mounted or combined with a wheeled platform, wagon, or traveling carriage, and adapted for right and left oblique adjustment, also for upward and downward adjustment by means of operating mechanism mounted upon the carriage, and under control of an attendant who rides thereon. These improvements are more especially adapted for use in connection with the machines described in Letters Patent Nos. 276,093 and 315,184, heretofore granted to me, but may, if desired, be employed in other forms of road-machines so far as practical.

The object of my invention is to provide a superior, more desirable, and efficient machine.

The particular features of invention and subject-matter claimed are hereinafter definitely specified.

In the references to the drawings, A denotes the carriage-body, wagon, or platform mounted on axles B B', and provided with traveling wheels B² B³. The forward end of the carriage is provided with arched irons A' that connect the body-timbers with the pintle block or bearer *a*, which rests upon the tongue-plate or axle B', and supports the forward part of the body in a manner to permit the front wheels to swing under when turning the team in short space.

C indicates the triangular push-frame for supporting the scraper-plate D from the rear of the machine, and E indicates the semicircular supporter or locking-circle, having recesses $e$ to receive the locking-bolt G, whereby the blade is retained at position of oblique adjustment.

I denotes the vertically-moving racks by which the respective ends of the blade are elevated or depressed, I' the vertical guide-standards, J the swinging cranes, and K the supporting-rods by which the blade and lifting-racks are connected.

The general location of the above named parts in the machine is substantially similar to that described in my former Letters Patent above named, and reference may be had to such patents for a more full understanding of the machine, if desired. The construction of the several parts and their manner of operation is, however, in many respects different; and I will proceed to describe such points of improvement as I include in my present claims.

One important feature of my invention consists in combining with the vertically-swinging push-frame a spring or device to sustain, counterbalance, or partially counterbalance the weight of said frame, together with the weight of the blade and parts connected thereto. This is, in the present instance, effected in the following manner: Near or beneath the rear axle, B, is a bar, $b$, the ends of which are supported by the side castings, $a^4$, which are rigidly connected with the axle and body A by braces and bolts. The rear end of the push frame C is hinged or supported on said bar $b$ by the bearing-castings $c'$ $c^2$, fastened to the rear ends of said frame C. The bar $b$ is made of spring-steel, preferably square or of rectangular section, although round or other suitably-formed bars could be used, if desired, and of a length sufficient to reach from one side-support to the other. At one end the bar $b$ is fitted into a rectangular socket in the cheek-casting $a^4$, or held therein in such manner that it is non-revoluble. Its opposite end is fitted to the opposite support or cheek-casting, $a^4$, with a revoluble sleeve, $b^2$, which permits free rotation of the end of the bar within its support, while it is securely retained in position in relation to the carriage and axle. (See Figs. 6 and 7.) One of the bearing-pieces, $c'$, on frame C is fitted to the bar $b$ by a square opening, as in Fig. 8, or so that the bar cannot turn in the bearing, while the opposite bearing, $c^2$, is fitted to the bar with a revoluble sleeve, $b^3$, or so as to turn freely thereon. The bar $b$ being held at one end rigid with the body or cheek casting $a^4$ and at the other end rigid with push-frame C, or its bearing $c'$, will be more or less twisted by the upward and downward swing of the frame C; consequently it acts as a torsional spring. The bar $b$ is disposed in the bearing-piece $c'$ in such relation that when the frame C is at normal position the bar will have sufficient twist or tension to develop a torsional strain that will substantially counterbalance the weight of the blade D and forward end of the push-frame, or to such extent as may be desired tend to raise the forward end of the frame C, thus in a measure relieving the adjusting mechanism from the weight of the blade and rendering it much easier and more convenient for the operator to control the machine.

While I prefer the construction of spring and connections above described, I do not confine myself to the exact forms shown; but include, broadly, mechanism in which a counterbalancing device is employed for supporting a scraper mechanism as within the scope of my invention.

Another feature of my invention is the hinge F, by which the blade D is connected to the front end or apex of the push-frame. This hinge is required to accommodate the right and left oblique swing of the blade, the backward and forward pitch adjustment, and the elevation or depression of either end of the blade when at any position of oblique or pitch adjustment. The detail of its construction is shown in Figs. 10, 11, 12, and 13. A plate or shoe, F', which is fitted and secured to the frame C, is provided at its front end with jaws $f$, the inner faces of which are parallel, or nearly so. Between these jaws is inserted a laterally double-beveled disk, $F^2$, carrying a hinge, wrist, or cylinder, $F^3$, at one side, and having a central opening that is inwardly tapered from above and below, through which passes the pivot-bolt or main center stud, $F^4$. The center of the disk from front to rear is of a thickness that will fit between the jaws $f$, while its sides are gradually tapered off to much less thickness. Thus as the disk $F^2$ swings around between the jaws $f$, the cylinder $F^3$ will be retained from independent up and down movement, but can be rocked laterally so as to raise one end or the other above the central plane. A hinge-plate, $D^2$, is secured to the back of the blade D, and between the ears thereof the cylinder $F^3$ is arranged and secured by the hinge-pin $f^5$, which passes through in a horizontal direction. The hinge-plate $D^2$ is made with a concave seating-surface, to receive the cylinder $F^3$, and the thrust-strain on the parts is borne on said surface instead of on the hinge-pin $f^5$. The edge of the disk $F^2$ is also fitted to take bearing against the back of its socket, so as to relieve the stud $F^4$ from excess of strain. The plate $D^2$ may be fitted with a lug, as at $d$, to keep the hinge-pin in position. Rotation of the disk between the jaws on stud $F^4$ accommodates the oblique adjustment of the blade D. The swing on the hinge-pin $f^5$ gives forward and backward pitch, and the rocking of the disk between the jaws accommodates the inclination of the blade as either end is raised higher than the other.

This form of hinge may be employed for connecting the push-frames or push-bars with the blade in other styles of road-machines from that here shown—as, for instance, those described in my applications Serial Nos. 164,547 and 167,212; and such use I desire to include as within the scope of my claims.

Another feature of my invention consists in the manner of constructing and arranging the semicircle E, said semicircle being formed of a bar of wrought or rolled inverted T or angle iron or steel, bent on a circular curve, or with its central part circular and its ends extending outward tangential as they approach the blade. To the ends of this bar are rigidly secured downwardly and forwardly extending hinging-pieces E', preferably of steel-castings, the lower extremities of which have hinge-wrists, that are seated and horizontally pivoted in connection with hinge-plates $D^3$, fixed on the back of the blade D, in line with the hinge-plate $D^2$ of the push-frame connection, so that the central axis of the three hinges will coincide.

The semicircle E is located above the push-frame C. The rear edge or flange of the T-bar circle passes between the jaws of the guide-block $E^2$, which latter is arranged upon a transom of the push-frame C, as indicated. The locking-bolt G is arranged in the block $E^2$, for engaging the recesses $e$ in the semicircle for retaining the blade D in positions of oblique adjustment, substantially as explained in my former patent. The locking-bolt lever H extends up through the platform A, to a convenient position to be reached by the operator, as indicated. When desired, a slide or foot-piece, $h$, may be arranged on the lever H, so that the locking-bolt can be released by the foot of the operator, or be held with the lock out of engagement by pressing the slide down upon the platform with the foot. This slide $h$ is preferably made, as in Fig. 37, of a piece of flat metal provided with an opening, $h^2$, for the lever H, and with a lug or turned-up end, $h^3$, for convenient engagement of the foot when moving the lever H. Said slide may be otherwise formed, if preferred, for effecting similar operation of the parts.

Figures 14, 15, 16, 17, 18, 19, 20, 21:
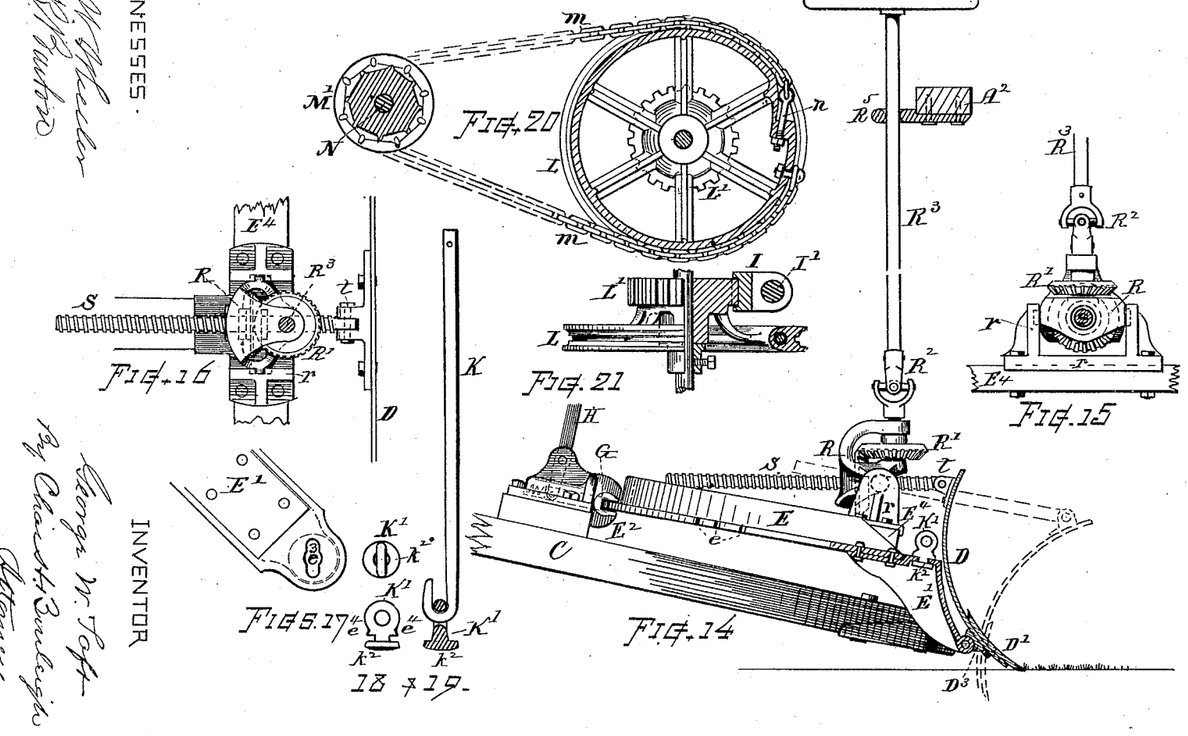
Fig. 14 is a section through the blade and semicircle hinge, showing a side view of the locking mechanism and pitch-adjusting mechanism.
Fig. 15 is a front view of the rocking-head and gears for operating the pitch-adjusting devices.
Fig. 16 is a plan view of the pitch-adjusting devices.
Fig. 17 shows the eye at the end of the semicircle.
Figs. 18 and 19 show details of the attaching-ring and lifting-rod.
Figs. 20 and 21 show details of the sheave or sprocket wheels and chain devices for the blade-lifting mechanism.

The end castings, E', of the semicircle are provided with openings $e^3$, (see Figs. 3 and 17,) for receiving flanged connecting-rings K', formed as indicated in Figs. 14, 18, and 19, by means of which the suspending rods K are connected to the end of the semicircle, and by the latter to the blade D, which is free to swing back and forward on the hinges $D^2$ $D^3$ without effecting the connection of the suspension-rods. When inserting the connecting-rings K', they are passed upward through the openings $e^3$, and are then given a quarter-turn, which brings them crosswise of the opening, when their lugs $e^4$ (see Figs. 18 and 14) stand over the plate at the sides of the opening, and thus prevents the ring from dropping back through the opening, while the disk or flat head $k^2$ prevents them from being drawn up through the opening by strain on the rod K. The lower end of the rod K is hooked into the ring K', and its upper end is fastened to the swinging arm or crane J, as indicated.

The cranes J may be constructed and arranged substantially in the usual manner, as heretofore employed.

The cheek-casting $a^4$ is made with a lug, recess, or seat and bolt-hole, at $a^6$, for sustaining the rear end of a detachable brace or thrust bar, as $g$, to be used for bracing the semicircle or forward end of the blade D when desired. Said bar may be carried on the side of the body A, to be placed for temporary use as a brace when required for especial occasions or for very severe work. In the ordinary working of the machine such brace $g$ is not required.

For operating the elevating and depressing mechanism of the respective ends of the blade I employ a system of hand-wheels, sprockets, and chains, gears, and lifting-racks. The sprocket or sheave wheels L have gears L' attached to their sides, which are mounted to turn on a suitable shaft or axis supported by the upright frame $A^2$ in position to mesh with the movable racks. Back from the sprocket-wheels L, and at a convenient position for the operator, are other sprockets or sheaves M', attached to hand-wheels M, and these are connected with the former by suitable bands or drive-chains, $m$, as indicated. Said hand-wheels are mounted on the axial shaft N, (or, if preferred, on suitable studs,) supported on the upright frames $A^2$, the mechanism being arranged in such manner that revolution of the hand-wheels will, through the aid of the chains and gears, move the racks up or down, thus raising and lowering the ends of the semicircle E and blade D, accordingly as the wheel is revolved forward or backward. A brake or stop device is provided for each of the hand-wheels, as at P. Said brakes are preferably connected by a pedal or foot-bar, $p'$, extending from one to the other, whereby the operator can release the brakes from either or both of the wheels N by placing his foot upon said bar near either end or centrally.

The wheels L and M' and their bands or chains $m$ may be of any suitable form for transmitting motion from the hand-wheels to the gears L'. The relative sizes of the hand-wheel M, sprocket-wheels M' L, and gear L' are made of such proportions as to give a movement and leverage that will enable the operator to adjust the blade with ease and facility when the machine is at work. I prefer, as in the present instance, to connect the chains $m$ to the wheel L in a manner to permit their adjustment for taking up the slack of the chain. (See Figs. 20 and 21). With devices such as shown the adjustment is effected by means of the eyebolts $n$ arranged with nuts for drawing them into the rim of the sprocket-wheel.

The arrangement of the lifting-rod K and swinging cranes J, in connection with each other and the racks I is substantially the same as described in my former patents.

By the arrangement of the operating mechanism as herein shown the operator can very readily and conveniently control the adjustment of the blade when the machine is at work, and this, too, without assuming a constrained or awkward position at any time or at any position of the adjustment, and the blade can be run up or down its full limit of action without the necessity of shifting the gears or changing the position, or by auxiliary levers sometimes heretofore employed.

The construction and arrangement of the hand-wheel, sprocket, gear, and chain mechanism, and the combination thereof with the blade apparatus in a diagonal road-scraper, are important features of my invention.

A screw mechanism, in combination with the blade, for imparting backward and forward pitch-adjustment thereto, is another feature of my invention. This pitch-adjusting mechanism is preferably arranged as follows: Upon the cross-bar $E^4$ of the semicircle (or some suitable support in the rear of the blade) is fixed a supporting-chair, $r$, in which is mounted on trunnions or axial bearings, parallel with the blade-hinges $D^2$ $D^3$, a rocking-head, R, that carries a pair of beveled gears, $R'$, properly journaled and supported in said head, so as to retain their working relation under various changes of position of the head R. Through one of said gears, which serves as a nut, is arranged a coarse-threaded screw, S, the forward end of which is hinged to the blade D, as indicated at $t$. To the arbor of the other gear is connected, by a universal coupling, $R^2$, a shaft, $R^3$, which extends upward to a position in convenient reach of the operator, where it is provided with a hand wheel or crank, $R^4$, by which it can be turned for revolving the gears $R'$, and thus by working the screw S back and forth, roll the top of blade D more or less to the front. (See Fig. 14.) The upper part of shaft $R^3$ is supported in a loose bearing at $R^5$, so that said shaft can accommodate itself to the various positions of the blade and pushing apparatus, the pitch-adjusting devices being thus practically operative at any time, irrespective of the positions of diagonal, inclined, or vertical adjustment that the scraper-blade may occupy. The head R and screw S swing around with the semicircle E, and to the length of the blade, at whatever degree of diagonal adjustment the machine is worked, and consequently the strain on the pitch-adjusting mechanism is brought direct and in line with the screw, so that the blade is held in a very strong and rigid manner thereby.

The pitch-adjusting screw and its operating shaft and gearing may be employed in combination with an adjustable scraper-blade in road-machines of other make than that herein illustrated, and I include such use and employment as within the scope of my invention.

It will be understood that the term "vertically adjustable" as herein used does not require that the adjustment should be absolutely on an exact vertical line of movement, but simply that the adjustment is upward and downward, or, in a general sense, the positions assumed are in higher or lower planes in relation to the carriage-body or plane of the road. The term "diagonal" or "oblique" adjustment refers to the swinging in horizontal plane or the position of the scraper in relation to the direction of draft of the machine. The term "inclined adjustment" refers to the raising or depressing of one end of the blade to greater or less height than the other, and the term "pitch-adjustment" refers to the rolling of the top of the blade forward or backward.

Figures 3, 4, 5, 6, 7, 8, 9, 10, 11, 12, 13:
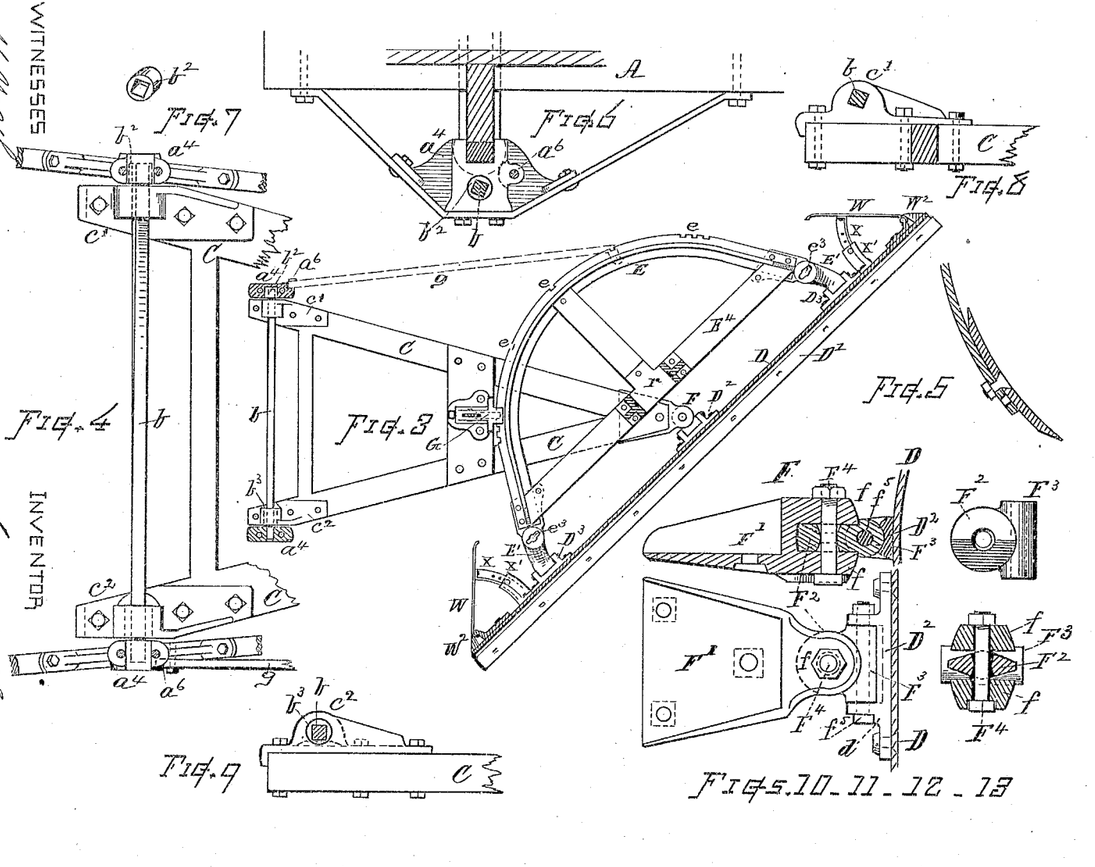
Fig. 3 is a plan view of the push-frame, semicircle, and scraper-blade.
Fig. 4 is a plan view of the rear end of the push-frame, showing the spring-bar and connections of somewhat larger scale.
Fig. 5 is a section of the re-enforce plate on the guiding-edge of the scraper-blade.
Fig. 6 is a transverse section of the rear axle, showing the side of the rod-supporting casting and braces.
Fig. 7 is a view of the bearing-sleeve.
Fig. 8 is a side view of one of the push-frame hinges.
Fig. 9 is a side view of the other hinge for the push-frame.
Figs. 10, 11, 12, and 13 show detail views of the apex hinge, by which the push-frame is connected to the blade.
Figures 32, 33, 34, 35, 36, 37:
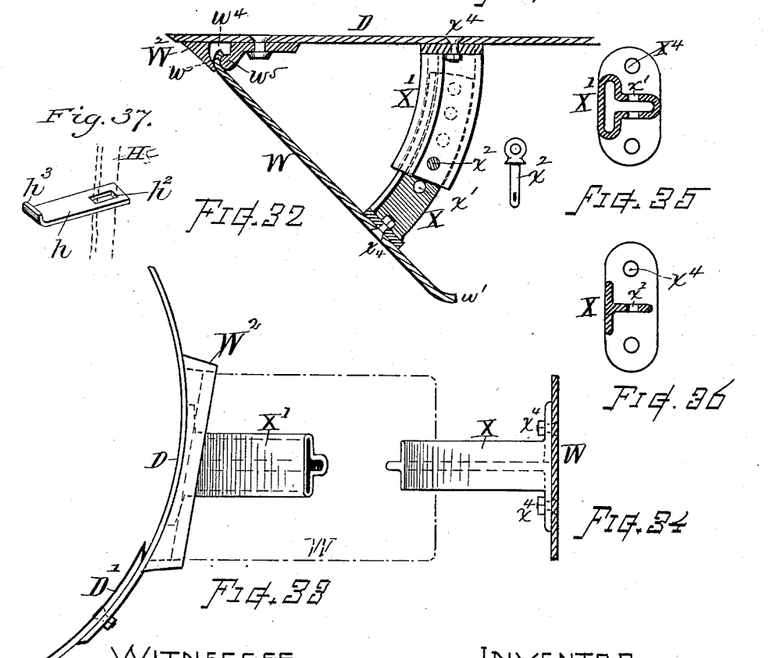
Fig. 32 is a horizontal section through the end of the blade, the landside-plate, and attaching-piece.
Fig. 33 is an end view of the blade, showing the attaching-piece and adjustment-arm for connecting the landside-plate to the blade.
Fig. 34 shows a section of the landside-plate and front of the telescoping adjusting-arm.
Figs. 35 and 36 are transverse sections of the adjusting-arms for the landside or wing plate.
Fig. 37 is a perspective view of the slide or foot-piece for the locking-bolt lever.

The working-edge of the blade D is re-enforced by a hardened-steel cutting-plate, $D'$, secured to the blade by bolts in the manner specified in my former patent. This re-enforce plate is, in my present improvement, made with its edges beveled off at the back, as indicated in Fig. 5. These beveled edges may be formed by pressing or rolling the bar of steel, so as to thin the edges before it is hardened, or in other suitable manner. The re-enforce plate is warped or curved to fit the curve of the blade D vertically, and the bevels are inclined in the same direction as the curvature. The ends of the blade D are also preferably made with a backward bevel or inclination, as indicated in Fig. 32.

I am aware that some scrapers heretofore patented show straight or flat re-enforce plates having opposite beveled or sharpened edges to form the cutting-edge of the scraper, and also that curved re-enforce plates have been used. I do not therefore include such plates as within the scope of my claim for the improved re-enforce or cutter specified herein.

Figure 30:
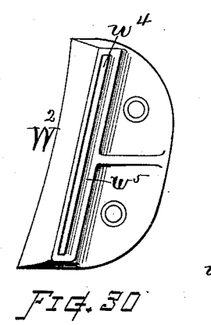
Fig. 30 is a rear view of the hinge or attaching-piece for the adjustable landside-plate.
Figure 31:
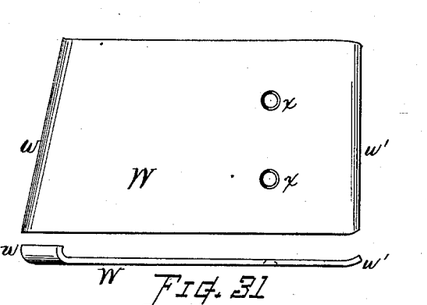
Fig. 31 shows a side and edge view of the landside-plate.

The improved construction of the landside-plate and its connections are features of my invention. In these the landside W is made from sheet-steel cut to the proper form, and its end edges, $w$ $w'$, bent about one-quarter circle, as shown in Fig. 31. Holes $x$ are drilled or punched through the plate for riveting on the brace-arm X. To the end of the blade D is riveted or bolted a connecting-plate, $W^2$, (see Figs. 30 and 32,) having a slot, $w^4$, with a cylindrical rib, $w^5$, at the back thereof. The curved edge of the plate W is inserted in the said slot to hook onto the cylindrical rib, in the manner indicated in Fig. 32, and this securely holds the plate without other fastening than the brace X X'. The adjustable landside-brace is made with curved telescoping parts X and X', which are respectively secured to the plate W and blade D by bolts or rivets set through the holes in their heads, as at $x^4$. The male part X is of T-section, and the female part X' has an internal cavity of corresponding section, into which the part X is inserted. A series of holes, $x'$, serve to give the adjustment accordingly as the pin $x^2$ is inserted therein.

By making the parts of the brace telescope in the manner explained, the landside is held in a very rigid and substantial manner, as the brace cannot twist, and side strains on the joints and adjusting-pins are counteracted.

Figures 22, 23, 24, 25, 27, 28, 29:
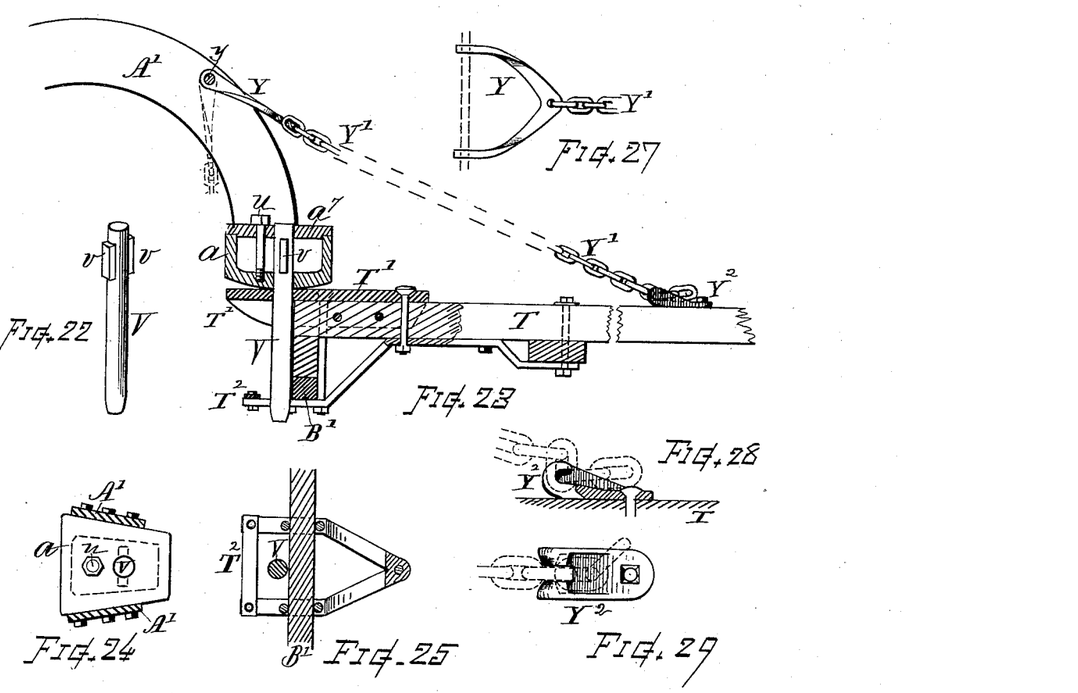
Fig. 22 is the king-bolt or pintle-pin.
Fig. 23 is a vertical section through the front axle, pintle-block, and tongue-connections.
Fig. 24 is a plan view of the pintle-block.
Fig. 25 is a sectional plan of the front axle and pintle-guard.
Fig. 27 is a plan view of the tongue-supporting yoke.
Figs. 28 and 29 show on larger scale a section and plan of the adjusting-hook for connecting the tongue-supporting chain.
Figure 26:
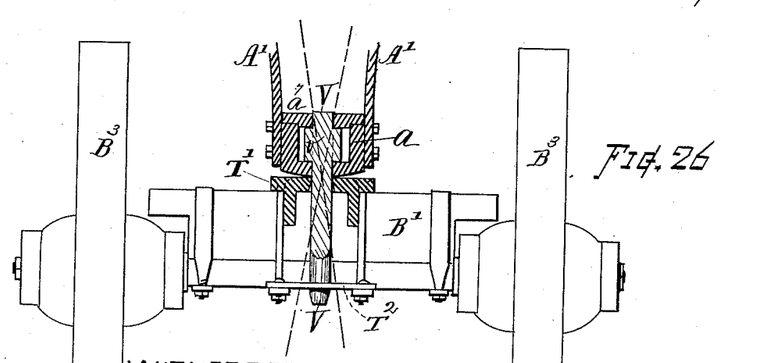
Fig. 26 is a transverse vertical section through the pintle devices, with rear view of the front running-gear.

In the mounting of the carriage-body on the front running-gear the arch-irons A' have their forward ends attached to a hollow bearer or pintle-block, $a$, the under side of which is slightly rounded in all directions, so that its under surface is substantially a section of a sphere, (see Figs. 23 and 26,) and this spherical surface rests upon a flat bearing-plate, T', supported on the tongue or pole T and axle B', in a manner to rock freely thereon. The king-bolt or pintle V is made with a head or side lugs, $v$, as indicated in Fig. 22, and it is inserted in a vertical opening through the block $a$, where it is confined by the cap-plate $a^7$, fitted in the top of the block, and secured by a bolt, $u$, in the manner illustrated. The pin passes down through the plate in rear of the axle B', at or near the bottom of which is arranged a guard-frame, $T^2$, the purpose of which is to limit the rocking action between the parts and prevent the axle and front wheels from tipping over when running the machine on steep declivities. Dotted lines on Fig. 26 indicate the extent or degree of right or left inclination which can be assumed by the pintle-pin in relation to the axle. The guard-frame $T^2$ is in the present instance formed by extending the braces back of the axle and bolting a cross-bar to their ends, as shown in Fig. 25; but, if preferred, any other suitable construction could be employed for effecting the result in equivalent manner.

Figure 2:
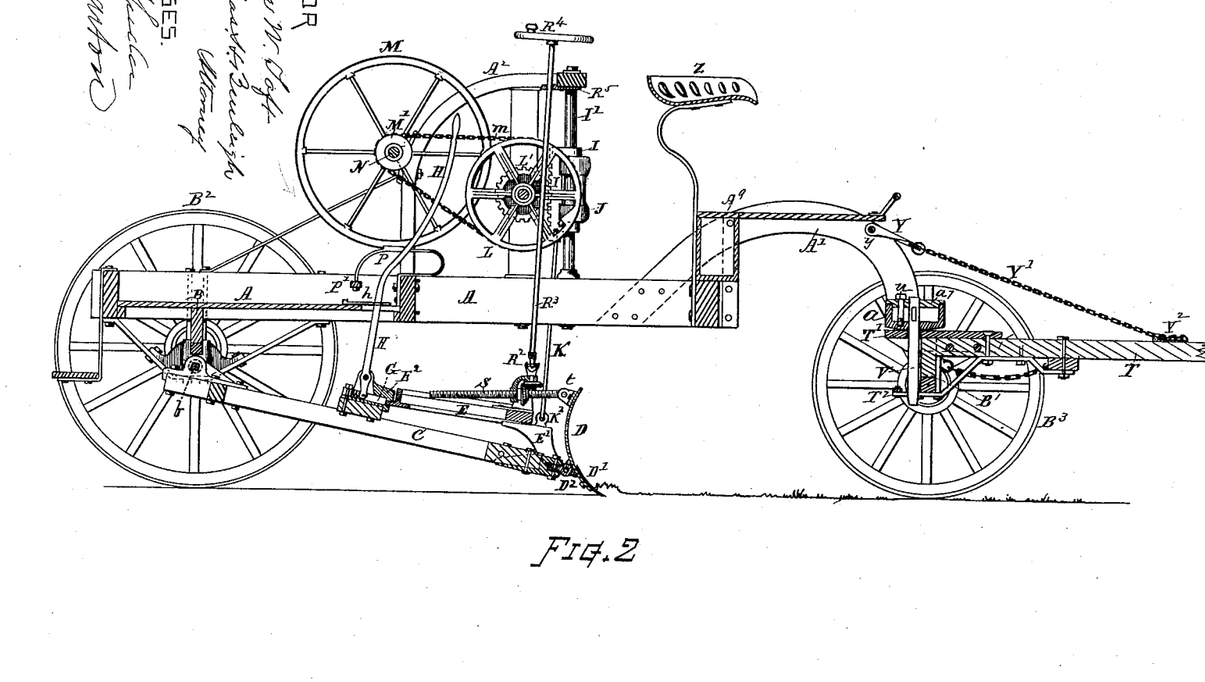
Fig. 2 is a longitudinal vertical section of the same.

Y indicates a yoke or bow of metal secured between the arch-irons A', as at $y$, in a manner to swing up and down. (See Figs. 2, 23, and 27.) To the front of said yoke, at a position at or nearly vertical above the axis of the pintle V, is secured one end of a stay or chain, Y', for supporting the pole. The opposite end of said chain is detachably connected to the pole by means of the peculiar coupling or hook $Y^2$, (see Figs. 23, 28, and 29,) which is rigidly attached to the pole, and which is so constructed that the chain can be readily connected and detached at the several links for varying the height at which the pole is held by raising a link into upright position, as indicated by dotted line, Fig. 28, but not when the links are straightened out or in normal position, as when under strain.

The stay Y' may be of chain or of a bar with a few links at its end to accommodate adjustment. By the yoke Y the connecting-point of the stay is brought to a position above and in line with the axis of the pintle, which is the pivotal axis of the axle and wheels, so that the pole can be swung around laterally without varying the tension of the stay-chain. The yoke can be swung down or back, (see dotted lines, Fig. 23,) to allow of the pintle-pin V being conveniently taken out when desired.

Figure 1:
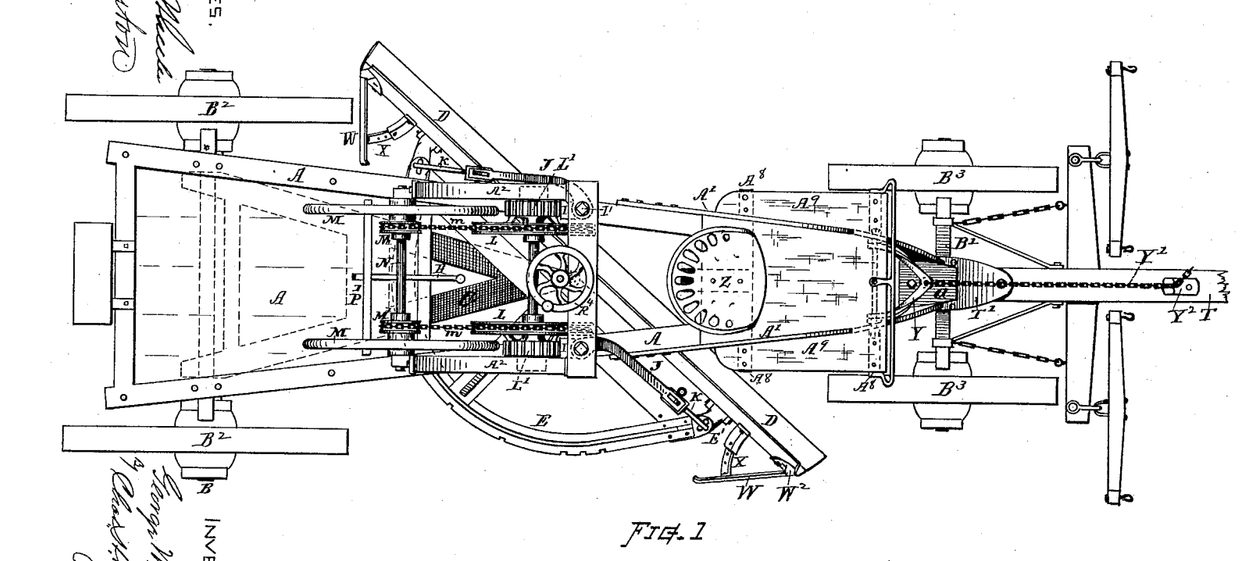
Figure 1 is a plan view of a road-machine illustrating features of my present invention.

Extending beyond the outer sides of the arch-irons A' are brackets or supporters $A^8$, which carry a platform, $A^9$, or foot-board, which is of greater width than the lateral extent of the arches which it overhangs at either side, as indicated in Fig. 1, thus giving a much safer and more convenient position for the driver than heretofore.

A foot rail or ledge may be arranged along the edge of the platform, if desired.

The driver's seat Z is arranged in ordinary manner, as shown.

In lieu of making the upright frame $A^2$ with curved sides, as indicated, said frame may be formed of inclined bars arranged to act as a truss for stiffening the body-timbers, if preferred. The hinging ends of the semicircle E might, if desired, be made by bending down or depressing the extremities of the T-bar circle and forging the hinge-wrists thereon, or in other manner forming the connection between the semicircle and blade; but I prefer the construction shown—viz., the steel castings E' and socketed hinges $D^3$.

What I claim as my invention, and desire to secure by Letters Patent, is—

1. In a machine for working roads by diagonal plowing operation, the combination of a diagonally-disposed scraping-blade supported for upward and downward adjustment, in connection with a wheeled carriage, mechanism connected with said blade for independently lifting and depressing the respective ends thereof, and a counterbalance device exerting a force counteractive to the gravity of said blade in its effect on said lifting and depressing mechanism, for the purpose set forth.

2. The combination of an upwardly and downwardly adjustable diagonal scraper-blade, a push-frame supporting said blade from the rear, and a counterbalancing device acting in opposition to the weight of the adjustable blade, substantially as set forth.

3. The combination of a diagonally-reversible scraper, a vertically-swinging push-frame, and a torsional counterbalancing device in connection with said frame, whereby a portion of the gravity of said scraper and frame is counteracted, as and for the purpose set forth.

4. The combination, substantially as described, of a diagonally-reversible vertically-adjustable scraper-blade, a supporting-carriage mounted on front and rear axles and wheels, blade-adjusting mechanisms mounted on said carriage, from which said blade is suspended, and a counterbalance device relieving said adjusting mechanism from the weight (or a portion of the weight) of said scraper-blade, as set forth.

5. The combination, with a vertically-adjustable scraper-blade supported in connection with a carriage mounted on front and rear wheels, of a thrust-frame connected with carriage by means of a spring attachment at the rear or hinging portion of said thrust-frame, said spring being arranged to exert a lifting force on said thrust-frame, for the purpose set forth.

6. The combination, with the push-frame C, of a torsionally-strained bar connecting the rear of said frame with the carriage, for the purposes set forth.

7. The combination, with the main carriage-frame A, rear axle, B, and push-frame C, of the cheek-pieces $a^4$, rigidly fixed to the main frame and axle, the bearing-pieces $c'$ $c^2$, fixed to the thrust-frame, the rotation-sleeves $b^2$ $b^3$, and the torsionally-strained bar $b$, confined by said cheek-pieces and bearings, in the manner substantially as set forth.

8. The combination, with the push-frame and scraper-blade, of a compound connecting-hinge having two pivots perpendicular to each other, seating-sockets sustaining the thrust-strain, and facilities for rocking action, substantially as described, to accommodate the oblique reversible, inclined, and pitch adjustments of said blade, as hereinbefore set forth.

9. The apex hinge F, composed of an attaching-plate having jaws $f f$, the horizontally-swinging laterally-beveled disk $F^2$, carrying the cylinder $F^3$, the connecting-plate $D^2$, and the vertical and horizontal pivot-pins $F^4$ $f^5$, in combination with an adjustable scraper and its supporting bars or frame, substantially as and for the purpose set forth.

10. In combination with the diagonally-adjustable scraper-blade and push-frame, an adjusting-segment or semicircle formed of a wrought or rolled flanged bar provided with the downwardly-extending end castings secured thereto and hinged to the rear of said blade, substantially as and for the purpose set forth.

11. In combination with the diagonally-adjustable blade and push-frame, the semicircle formed of a wrought T-bar having outwardly-extending ends provided with downwardly-inclined hinge-pieces, as E', the lower extremities of which are connected with the blade by hinges and their upper portions provided with eyes or loops, and the suspending-rods attached thereto, substantially as set forth.

12. In combination, substantially as described, the push-frame, the scraper-blade connected thereto by the compound apex hinge for universal adjustment, the semicircle arranged above said push-frame and provided with downwardly-extending hinging ends connected by hinge-plates to the back of the blade near its lower edge, in line with said apex-hinge, and the guiding and locking devices disposed above and supported on said push-frame at the rear of said semicircle, for the purposes set forth.

13. The combination, in a wheeled road-machine, of an adjustable scraper-blade, an adjusting semicircle hinged to the rear of said blade, suspending-rods connected to the ends of said semicircle, mechanism for elevating and depressing said rods, and devices for locking said semicircle at different positions of angular adjustment, substantially as set forth.

14. The supension-ring H', having head-disk $k^2$ and lugs $e^4$, in combination with the semicircle having the end pieces, E', provided with the opening $e^3$, and the hooked suspension-rod K, substantially as set forth.

15. The combination of the diagonally-adjustable blade, the semicircle connected to the rear thereof, the locking-bolt G, having a lever, H, extending up through the carriage-platforms, and the foot-slide $h$, arranged on said lever, substantially as and for the purpose set forth.

16. The combination of an adjustable scraper, a vertically-movable rack connected for raising or depressing the end of said scraper, a sprocket-wheel and gear connected for working said rack, a second sprocket and hand wheel, and a chain (or band) connecting said first and second sprockets, substantially as and for the purpose set forth.

17. The combination, substantially as hereinbefore described, of the hand-wheel M, carrying the sprocket (or sheave) M', the sprocket (or sheave) L, carrying the gear L', the connecting-chain (or band) $m$, the rack I, arm J, suspending-rod K, and adjustable-scraper mechanism, for the purpose set forth.

18. In combination, substantially as hereinbefore described, the carriage mounted on front and rear axles and wheels, the adjustable scraper-blade, the push-frame sustaining said blade from the rear, a semicircle and lock device for retaining said blade in diagonal relation to said push-frame, the swinging cranes in connection with vertically-movable racks, rods connecting said cranes and the blade-supporting mechanism, a pair of hand-wheels and sprockets mounted on a transverse shaft above the carriage-platform, with connecting-gearing for operating said racks, and brake devices engaging therewith, for the purpose set forth.

19. The combination, substantially as hereinbefore described, of the adjustable scraper-blade, the racks I, connected for lifting and depressing the ends thereof, the pinions L', the hand-wheels M, sprocket-wheels L and M', and adjustable tension-chains $m$, for the purpose set forth.

20. The combination, in a road-machine, of an adjustable scraper-blade, a blade-adjusting mechanism controlled by a revoluble hand-wheel, and a counterbalance device for relieving said hand-wheel from the excess of strain on the upward throw or movement of the blade, whereby the effective momentum of said hand-wheel is rendered approximately uniform for either upward or downward adjustment of the blade.

21. The combination, with the hand-wheels, of the brake or holding devices having a pedal-bar, P', arranged for operating either of the brakes alone or both simultaneously, substantially as set forth.

22. In a diagonal road-machine, the combination of a scraper blade or bar hinged for backward or forward tipping action and a screw for varying the backward and forward pitch and sustaining said blade at positions of adjustment, substantially as set forth.

23. In combination with an adjustable scraper bar or blade hinged for backward or forward pitch adjustment, a screw device for controlling the pitch adjustment of said blade, a geared nut upon said screw supported in a swiveling head-block, and means for revolving said geared nut for effecting adjustment of the mechanism, substantially as set forth.

24. In a road-grading machine having a scraper bar or blade supported beneath a carriage mounted on front and rear axles and wheels, and hinged for backward and forward pitch adjustment, in combination with said blade and its supporting-frame, a screw and nut mechanism for effecting the pitch adjustment, and means for operating said screw mechanism under control of the attendant from his position upon the carriage-platform, substantially as set forth.

25. The combination of a diagonally-adjustable scraper-blade hinged for backward and forward tipping action to a diagonally-adjustable frame or semicircle, a pitch-adjusting screw and actuating mechanism mounted in connection with said frame and movable therewith to maintain its perpendicular relation to the blade as said blade is swung from one position of diagonal adjustment to another, substantially as set forth.

26. The combination of the push-frame C, the semicircle E, having a cross-bar, $E^4$, the blade D, hinged near its lower edge to the apex of said push-frame and depending ends of said semicircle, a screw, S, hinged to the upper part of the blade, the chair $r$, fixed on said cross-bar, a rocking head mounted in said chair, a nut working on said screw and confined in said head, and means for revolving said nut, substantially as and for the purpose set forth.

27. The combination, substantially as described, of the scraper-blade, the support-bar in rear of said blade, the chair fixed thereon, the screw S, connected with the blade, the rocking head mounted in said chair, the geared screw-nut and operating-gear confined in said head, the shaft $R^3$, having a universal coupling connected with said gear and the operating-wheel R, for the purposes set forth.

28. The combination, with the scraper-blade in a diagonal road-machine, of an attachable re-enforce or cutting edge formed of a vertically-curved hardened steel plate, the edges whereof are reduced by bevels which incline in the same direction as the curvature of the plate, substantially as shown and described.

29. The landside-plate formed of a plain sheet of metal, with its edge $w$ curved, as shown, in combination with the attaching-plate $W^2$, having a slot, $w^4$, and cylindrical rib $w^5$, the blade D, and brace X, substantially as set forth.

30. The adjustable landside-brace composed of telescoping male and female parts X X', in combination with the swinging landside-plate and scraper-blade and the locking pin or device $x^2$, substantially as set forth.

31. In a diagonal road-machine, the combination, with the carriage-body and rear axle, of a cheek-casting, as $a^4$, provided with a lug or recess, as $a^6$, for sustaining the end of a detachable temporary thrust-brace, as $g$, substantially as and for the purposes set forth.

32. The combination, substantially as described, of the hollow pintle-block rigidly secured between the arch-irons A', the tongue-plate T, secured to the tongue and axle, the pintle V, having its head or lugs $v$ confined within said block, as shown, with its end extending down in rear of the axle, and the guard $T^2$, limiting the movement of parts in relation to each other, for the purpose set forth.

33. In a road-machine, in combination with the arched iron A' at the forward part of the carriage-body, the overhanging foot-board $A^9$ and supports $A^8$, substantially as and for the purpose set forth.

34. The combination, with the arch-irons A' in a road-machine, of the yoke Y, the stay Y', connected to said yoke at a position above the pintle-bolt and having its forward end connected to the pole T, substantially as and for the purpose set forth.

35. The combination of the arch-frames A', the yoke Y, pivoted to swing backward between the same, the stay-chain Y', having one end attached to said yoke, the tongue or pole T, the link-locking hook $Y^2$, secured to said pole and adapted for detachably retaining the links of said chain, substantially as and for the purpose set forth.

Witness my hand this 30th day of July A. D. 1885.

GEORGE W. TAFT.

Witnesses:
CHAS. H. BURLEIGH,
S. R. BARTON.